United States Patent
Wakabayashi et al.

(10) Patent No.: US 11,722,842 B2
(45) Date of Patent: Aug. 8, 2023

(54) TELECOMMUNICATIONS APPARATUS AND METHODS

(71) Applicants: Sony Corporation, Tokyo (JP); Sony Mobile Communications Inc., Tokyo (JP)

(72) Inventors: Hideji Wakabayashi, Basingstoke (GB); Anders Berggren, Basingstoke (GB); Yuxin Wei, Basingstoke (GB); Vivek Sharma, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 279 days.

(21) Appl. No.: 16/954,531

(22) PCT Filed: Dec. 14, 2018

(86) PCT No.: PCT/EP2018/085047
§ 371 (c)(1),
(2) Date: Jun. 17, 2020

(87) PCT Pub. No.: WO2019/121419
PCT Pub. Date: Jun. 27, 2019

(65) Prior Publication Data
US 2020/0344572 A1    Oct. 29, 2020

(30) Foreign Application Priority Data
Dec. 18, 2017 (EP) ...................... 17208148

(51) Int. Cl.
*H04W 4/024* (2018.01)
*G01S 5/02* (2010.01)
(Continued)

(52) U.S. Cl.
CPC .......... *H04W 4/024* (2018.02); *G01S 5/0236* (2013.01); *G01S 19/48* (2013.01); *H04W 64/006* (2013.01)

(58) Field of Classification Search
CPC ... H04W 4/024; H04W 64/006; H04W 64/00; G01S 5/0236; G01S 5/0263; G01S 19/48; G01S 5/01
See application file for complete search history.

(56) References Cited

U.S. PATENT DOCUMENTS 8,332,140 B2 * 12/2012 de Silva ................ H04W 4/029
701/412
8,825,377 B2 * 9/2014 Callaghan .......... G01C 21/3415
701/416

(Continued)

FOREIGN PATENT DOCUMENTS

EP    2046087 A1    4/2009
EP    2270535 A2 *  1/2011  ............. G01S 19/48

(Continued)

OTHER PUBLICATIONS

International Search Report and Written Opinion dated Mar. 29, 2019 for PCT/EP2018/085047 filed on Dec. 14, 2018, 13 pages.

(Continued)

*Primary Examiner* — Charles N Appiah
*Assistant Examiner* — Nicole M Louis-Fils
(74) *Attorney, Agent, or Firm* — Xsensus LLP

(57) ABSTRACT

A method of operating a terminal device supporting a plurality of positioning techniques which use positioning measurements made by the terminal device and positioning assistance information received from a location server to determine the location of the terminal device. The method includes: establishing a target location; selecting a first positioning technique for navigating towards the target location; receiving first positioning assistance information (Continued)

from the location server for the first positioning technique; determining a first location of the terminal device in accordance with the first positioning technique and the first positioning assistance information; establishing a first trigger for using a second positioning technique which is associated with higher positioning accuracy than the first positioning technique; and, in response to determining the first trigger is satisfied, determining a second location of the terminal device in accordance with the second positioning technique and second positioning assistance information received from the location server.

17 Claims, 8 Drawing Sheets

(51) Int. Cl.
*G01S 19/48* (2010.01)
*H04W 64/00* (2009.01)

(56) References Cited

U.S. PATENT DOCUMENTS

| | | | |
|---|---|---|---|
| 2006/0052115 | A1 | 3/2006 | Khushu |
| 2006/0240841 | A1 | 10/2006 | Bhattacharya |
| 2009/0192709 | A1* | 7/2009 | Yonker .................. G01C 21/20 701/470 |
| 2013/0017840 | A1 | 1/2013 | Moeglein et al. |
| 2013/0130718 | A1* | 5/2013 | Sharma ................. H04W 4/023 455/456.3 |
| 2014/0248901 | A1* | 9/2014 | Johnsson ............. H04W 8/005 455/456.1 |
| 2014/0274108 | A1 | 9/2014 | Venkatraman et al. |
| 2014/0274130 | A1* | 9/2014 | Venkatraman ........ G01S 5/0236 455/456.2 |
| 2017/0006426 | A1* | 1/2017 | Fu ......................... H04W 72/10 |

FOREIGN PATENT DOCUMENTS

| | | | |
|---|---|---|---|
| EP | 2270535 A2 | 1/2011 | |
| WO | 2007/025151 A2 | 3/2007 | |
| WO | 2016/130353 A2 | 8/2016 | |
| WO | WO-2016130353 A2 * | 8/2016 | ........... H04B 7/0413 |
| WO | 2019/086309 A1 | 5/2019 | |

OTHER PUBLICATIONS

3GPP, "LTE; Evolved Universal Terrestrial Radio Access Network (E-UTRAN); Stage 2 functional specification of User Equipment (UE) positioning in E-UTRAN," ETSI 3rd Generation Partnership Project, Technical Specification 36.305, Version 14.2.0, Release 14, Jul. 2017, pp. 1-80.
3GPP, "LTE; Evolved Universal Terrestrial Radio Access (E-UTRA); Radio Resource Control (RRC); Protocol specification," ETSI 3rd Generation Partnership Project, Technical Specification 36.331, Version 14.2.2, Release 14, May 2017, pp. 1-726.
3GPP, "LTE; Evolved Universal Terrestrial Radio Access (E-UTRA); LTE Positioning Protocol (LPP)," ETSI 3rd Generation Partnership Project, Technical Specification 36.355, Version 14.3.0, Release 14, Oct. 2017, pp. 1-171.
3GPP, "LTE; Evolved Universal Terrestrial Radio Access Network (E-UTRAN); Architecture description," ETSI 3rd Generation Partnership Project, Technical Specification 36.401, Version 14.0.0, Release 14, Apr. 2017, pp. 1-22.
Thorpe, M. and Zelmer, E., "LTE Location Based Services Technology Introduction," White paper, Rohde & Schwarz LTE Location Based Services, Sep. 2013, pp. 1-23.
5G, "The Mobile Broadband Standard," 3GPP Specification Series, 36, 7 pages, [Retrieved on Jun. 10, 2020] Retrieved from the Internet:<https://www.3GPP.org/DynaReport/36-series.htm>.
5G, "The Mobile Broadband Standard," 3GPP Specification Series, 38, 3 pages, [Retrieved on Jun. 10, 2020] Retrieved from the Internet: <https://www.3GPP.org/DynaReport/38-series.htm>.

* cited by examiner

TELECOMMUNICATIONS APPARATUS AND METHODS

CROSS-REFERENCE TO RELATED APPLICATIONS

The present application is based on PCT filing PCT/EP2018/085047, filed Dec. 14, 2018, which claims priority to EP 17208148.1, filed Dec. 18, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and supporting a wider range of services than current systems are optimised to support. For example it is expected future wireless communications networks will be expected to support more advanced/improved location-based services than current systems. In view of this there is expected to be a desire for future wireless communications networks, for example those which may be referred to as 5G or new radio (NR) system/new radio access technology (RAT) systems, as well as future iterations/releases of existing systems, to efficiently support location/positioning services, for example to provide a user with accurate/precise positioning information/guidance while also managing the power required to provide such services to help prolong device battery life.

The desire for new positioning/location services gives rise to new challenges for efficiently supporting these services in wireless telecommunications systems.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
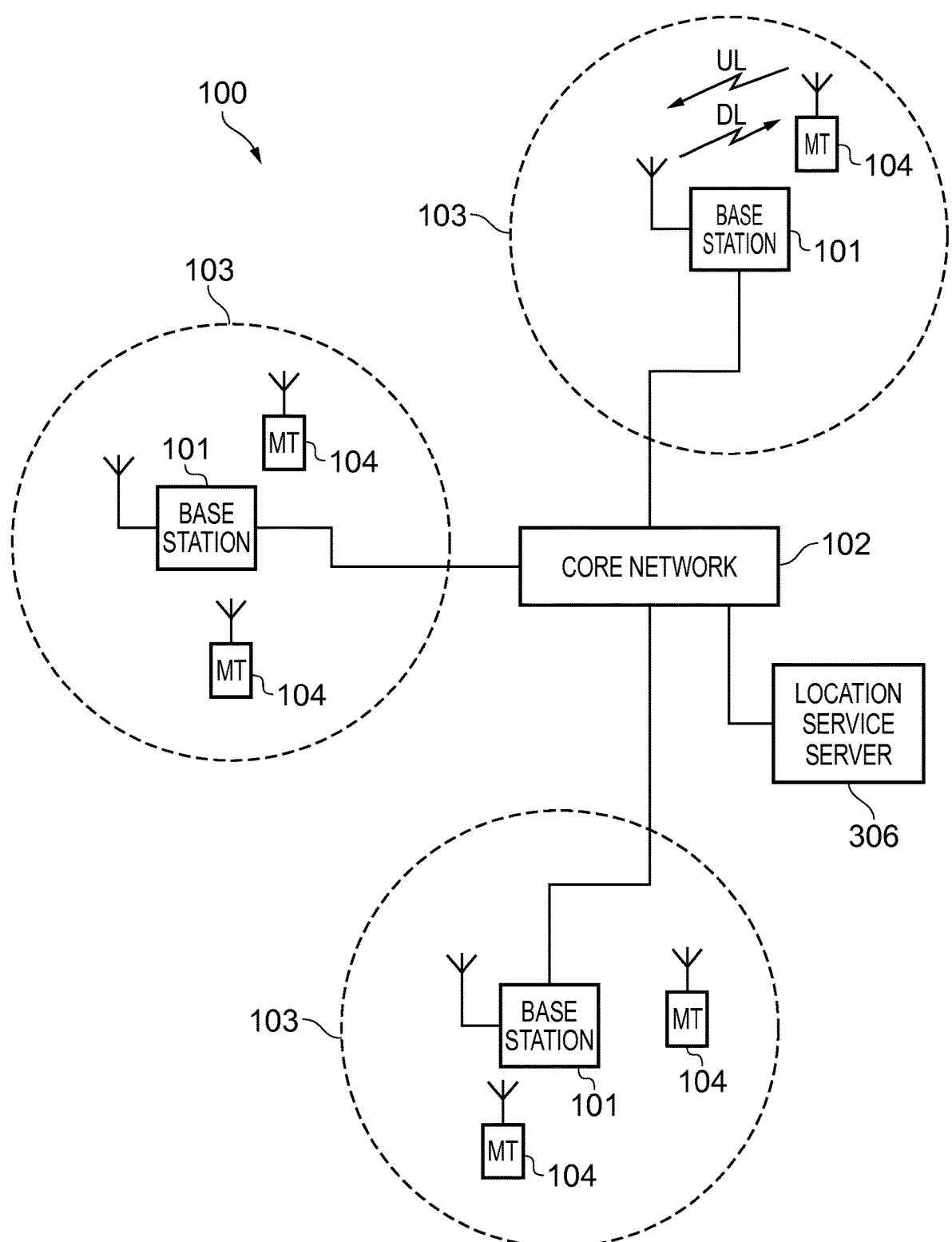
FIG. 1 schematically represents some aspects of a wireless telecommunication system which may be configured to operate in accordance with certain embodiments of the present disclosure.

FIG. 1 provides a schematic diagram illustrating some basic functionality of a mobile telecommunications network/system 100 that may operate generally in accordance with LTE principles and/or other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, such as the 3GPP TS36 series primarily relating to LTE [1] and the 3GPP TS38 series primarily relating to NR [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102 and a location service server 306 (discussed further below). Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. Wireless communications systems such as those arranged in accordance with the 3GPP defined Long Term Evolution (LTE) architecture may use an orthogonal frequency division modulation (OFDM) based interface for the radio downlink (so-called OFDMA) and a single carrier frequency division multiple access scheme (SC-FDMA) on the radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to base stations of FIG. 1. Thus, the term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

Figure 2:
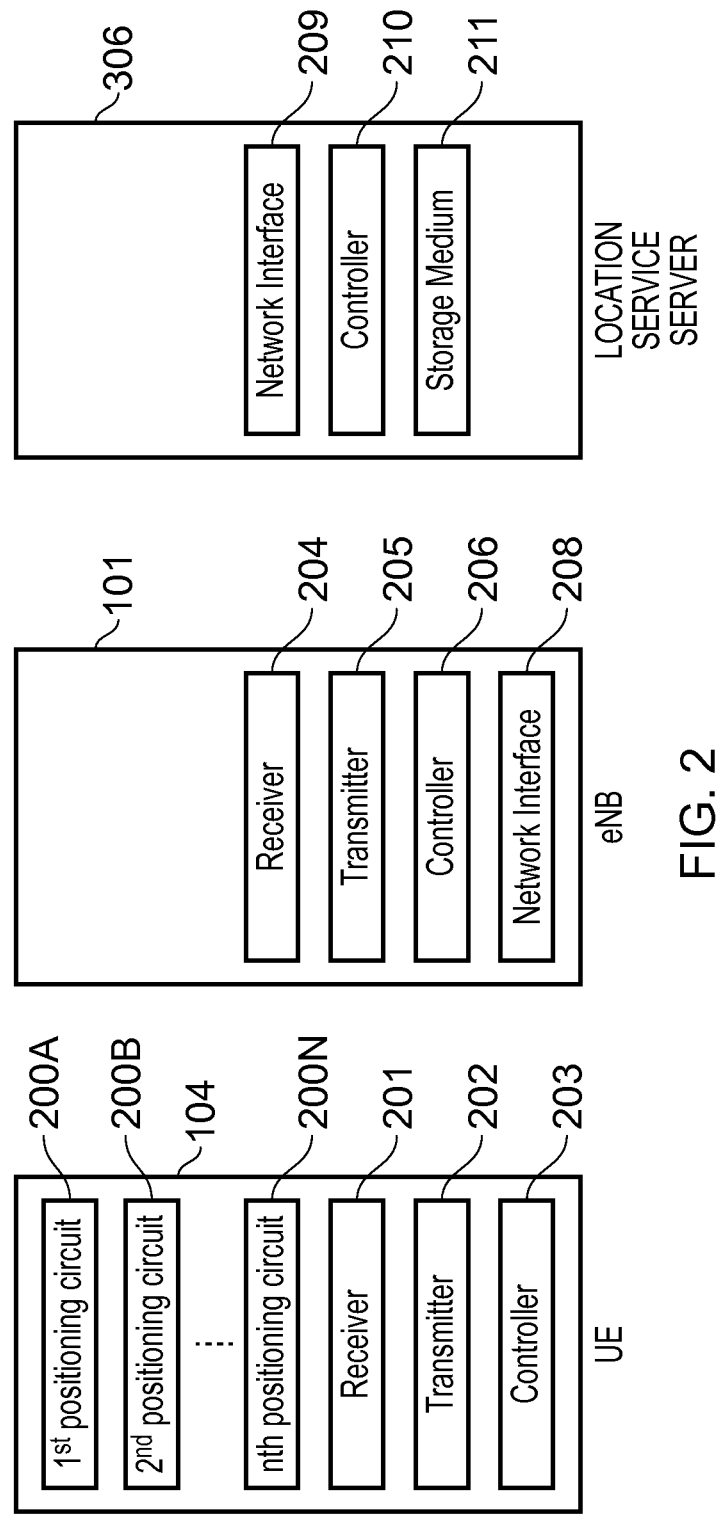
FIG. 2 schematically shows some example further aspects of a terminal device according to an example embodiment of the present disclosure.

FIG. 2 schematically shows some components of a UE 104, a base station 101 and a location server 306 according to an example embodiment.

The UE 104 comprises circuitry for a plurality of different position sensing technologies/techniques as schematically represented in FIG. 2 by a first positioning circuit (circuitry) 200A, second positioning circuit (circuitry) 200B, . . . nth positioning circuit (circuitry) 200N. These respective circuits may be used by the terminal device to establish position estimates for the terminal device in accordance with different position sensing technologies. The UE further comprises, a receiver 201 and a transmitter 202 (which together function as a transceiver/transceiver circuitry for the terminal device) and a controller (processor circuitry) 203. The respective positioning circuits 200 comprises circuitry for determining a position for the terminal device (UE) in accordance with different position sensing technologies as discussed further herein. One of the positioning sensing technologies in accordance with certain embodiments of the disclosure is a global navigation satellite system (GNSS) technology, such as GPS. Thus, in this example the first positioning circuit 200A comprises a GNSS receiver. The receiver 201 is for reception of wireless signals (e.g. radio signals). The transmitter 202 is for transmission of wireless signals (e.g. radio signals). The controller 203 is configured to control the positioning circuits 200, receiver 201 and transmitter 202 and to control the UE 104 to operate in accordance with embodiments of the present disclosure. The controller 203 may comprise various sub-units for providing functionality in accordance with embodiments of the present disclosure as explained further herein. These sub-units may be implemented as discrete hardware elements or as appropriately configured functions of the controller 203. Thus the controller 203 may comprise circuitry that is suitably configured/programmed to provide the desired functionality described herein using conventional programming/configuration techniques for equipment in telecommunications systems. The positioning circuits/circuitry 200, receiver 201, transmitter 200 and controller 203 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. In particular, although the position circuitry elements 200 shown in FIG. 2 are represented separately from the controller circuitry 203, in generally the position circuitry may be considered a part of the controller circuitry for the terminal device. That is to say, the functions of the positioning circuits may be sub-functions of the controller circuitry. It will also be appreciated that, although not shown, the UE 104 will in general comprise various other elements associated with its operating functionality, such as a user interface, battery, and the like.

The base station (network access node) 101 comprises a transmitter 205 and a receiver 204 (which together operate as a transceiver/transceiver circuitry for the base station), a network interface 208 and a controller (processor circuitry) 206. The transmitter 205 is for transmission of wireless signals (e.g. radio signals), the receiver 204 is for reception of wireless signals (e.g. radio signals), the network interface 208 for transmission and reception of signals (e.g. to and from a location server via the core network as explained further herein) over a network such as the internet, and the controller 206 is configured to control the transmitter 205, receiver 204 and network interface 208 to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may comprise circuitry suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality.

The data processing apparatus 306 comprises a network interface 209, a storage medium 211 and a controller (processor circuitry) 210. The network interface 209 is for transmission and reception of signals (e.g. to and from infrastructure equipment, such as the base station 101 via the core network, as discussed further herein) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure The controller 210 may comprise various sub-units for providing functionality in accordance with embodiments of the present disclosure as explained further below. These sub-units may be implemented as discrete hardware elements or as appropriately configured functions of the controller 210. The controller 210 may thus comprise circuitry suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the data processing apparatus 306 will in general comprise various other elements associated with its operating functionality.

It has been proposed for wireless telecommunications systems to include a location server to provide terminal devices with information to help them when estimating their position and to support location based services. For example, in one operating scenario for the UE 104, the first positioning circuit (GNSS receiver) 200A is configured to receive first signalling from one or more signal emitting devices located at respective spatial positions—i.e. positioning satellites, such as GPS satellites. The transmitter 202 is configured to transmit second signalling to infrastructure equipment (such as the base station 101) of the wireless telecommunications network. The receiver 201 is configured to receive third signalling from the infrastructure equipment, the third signalling being transmitted by the infrastructure equipment in response to the infrastructure equipment receiving the second signalling, the third signalling indicating the respective spatial positions of each of the one or more signal emitting devices (e.g. GPS satellites). The third signalling may be comprised within a system information block (SIB). The controller 203 is configured to determine a spatial position of the terminal device based on the received first and third signalling. In that sense, the terminal device is able to obtain positioning information using its positioning circuitry, and to request from the network information to use in conjunction with its own positioning information to help determine a position for the terminal device. The information requested from the network may be communicated to the terminal device in a system information broadcast, SIB, in an approach known as on demand SIB. One aspect of using SIB is that the terminal device may obtain the information in a radio resource connection, RRC, idle or inactive mode.

In the base station 101, the receiver 204 is configured to receive the second signalling from the terminal device/UE 104, the second signalling being transmitted by the terminal device in response to the terminal device receiving the first signalling using its GNSS receiver 200A. The controller 206 is configured, in response to the reception of the second signalling, to obtain information on the respective spatial positions of each of the one or more signal emitting devices (GNSS satellites) from the location server. The transmitter 205 is configured to transmit third signalling to the terminal device, the third signalling indicating the respective spatial positions of each of the one or more signal emitting devices and the third signalling being comprised within a system information block (SIB) transmission.

Thus in an embodiment, the controller 203 of the UE 104 is configured to determine a spatial position of the terminal device using information obtained using its positioning circuitry and associated assistance information obtained from the network, for example using an on demand SIB approach to obtain the assistance data from a location server. That is to say, in embodiments of the present technique, the base station 101 (e.g. an LTE base station (eNodeB) or NR base station (gNodeB)) may transmit assistance information for positioning (comprised within the third signalling in the above example implementation) using on-demand system information. The UE 104 can receive the assistance information in RRC idle mode or RRC inactive mode (although it may be noted note that a RRC connected mode UE may also receive the assistance information in the same way). To support on-demand system information (SI) in this way, in an embodiment, UE signalling may be transmitted in a random access procedure (e.g. in association with Msg1 or Msg3 in a Random Access Channel (RACH) procedure) for requesting on-demand SI. While the foregoing provides one example approach for a terminal device to request positioning systems information from the network, it will be appreciated in accordance with other example implementations the terminal device may obtain positioning assistance information for use in accordance with embodiments of the disclosure in other ways, i.e. without using on-demand SIB. However, on-demand to SIB approaches may be particularly suitable for helping reduce terminal device power consumption since it allows positioning assistance data to be obtained by the terminal device in idle/inactive RRC mode.

Further details on some proposals for on-demand SI approaches are provided in WO2016/130353 [3], for example. Also, further details on the use of network positioning assistance information and more general aspects of proposed LPP (location position protocol) approaches may be found, e.g., in the document "LTE Location Based Services—Technology Introduction" white paper published by Rohde and Schwarz, April 2013 [4], available at: http://www.rohde-schwarz-wireless.com/documents/LTELBSWhitePaper_RohdeSchwarz.pdf.

Figure 3:
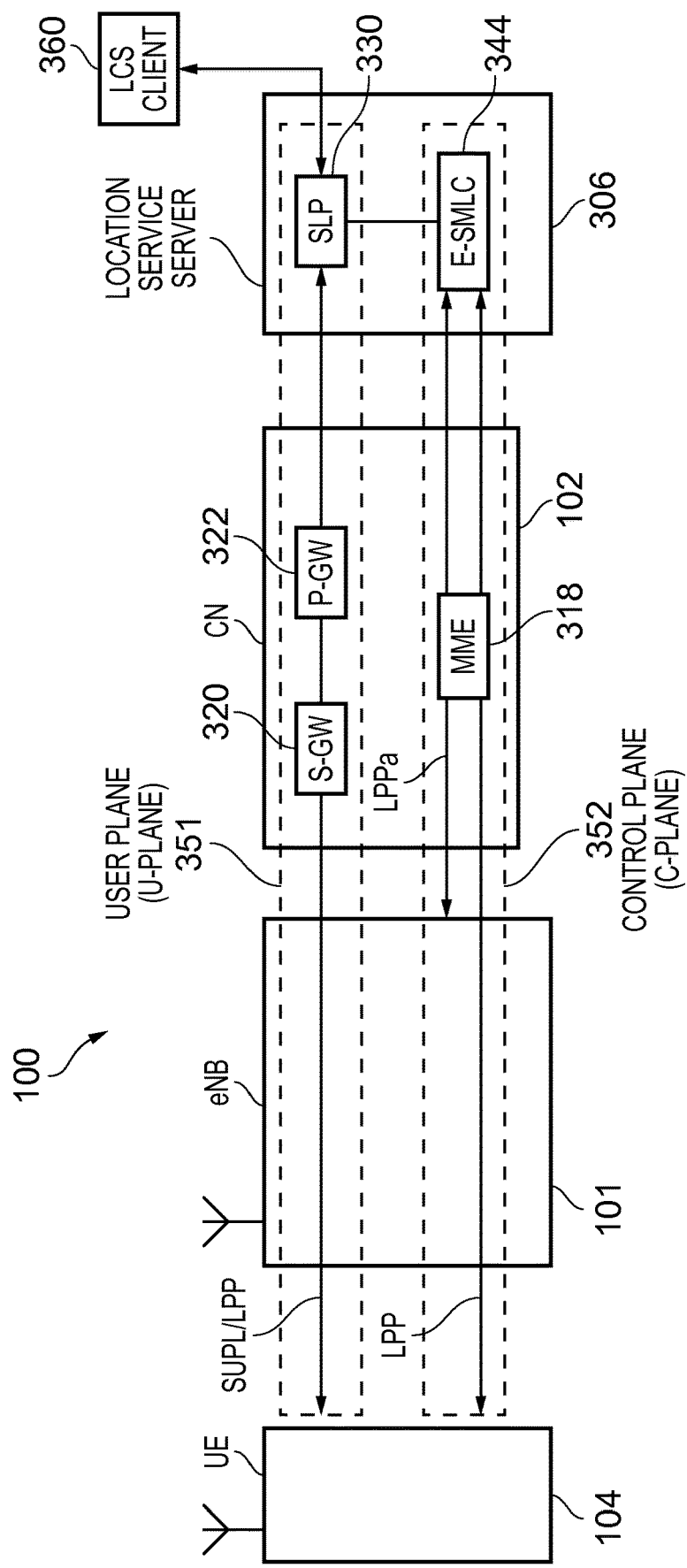
FIG. 3 schematically represents some aspects of a wireless telecommunication system in accordance with certain embodiments of the present disclosure.

FIG. 3 schematically shows some further aspects of the telecommunications system 100 configured to support operations in accordance with certain embodiments of the disclosure. As noted above, many aspects of the operation of the telecommunications system/network 100 are known and understood and are not described here in detail in the interest of brevity. Aspects of the architecture and operation of the telecommunications system 100 which are not specifically described herein may be implemented in accordance with any previously proposed techniques, for example according to current 3GPP standards, such as the 3GPP TS36 series primarily relating to LTE [1] and 3GPP TS38 series primarily relating to NR [2], and other proposals for operating wireless telecommunications systems/networks. The network access node 101 may, for convenience, sometimes be referred to herein as a base station 101, it being understood this term is used for simplicity and is not intended to imply the network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

Thus the telecommunications system 100 comprises the core network part (evolved packet core) 102 coupled to a radio network part and a location service server 306. The radio network part comprises the radio network access node (e.g. base station in an LTE implementation) 101 and the terminal device 104. It will of course be appreciated that in practice the radio network part may comprise a plurality of network access nodes serving a larger number of terminal devices across various communication cells. However, only a single network access node and one terminal device are shown in FIG. 3 in the interests of simplicity.

The terminal device 104 is arranged to communicate data to and from the network access node (transceiver station/network infrastructure equipment) 101 which in turn is communicatively coupled to the core network 102, which provides an interface to external application servers, such as the location service server 306. In the user plane (U-plane) 351, data is exchanged between the UE 104, base station 101, serving gateway 320, packet data network (PDN) gateway 322, SLP (SUPL, Secure User plane Location, Location Platform) 330 in the location service server 306 and LCS client 360 via the SUPL and/or LPP protocols. In the control plane (C-plane) 352, data is exchanged between the base station 101, mobile management entity (MME) 318 and evolved serving mobile location centre, E-SMLC, 344 (comprised within the location service server 306) via the LPPa (LTE Positioning Protocol Annexe) protocol. Furthermore, data is exchanged between the UE 104, base station 101, MME 318 and E-SMLC 344 via the LPP protocol. More details regarding the overall architecture represented in FIG. 3 may be found, for example, in the document "LTE Location Based Services—Technology Introduction" white paper published by Rohde and Schwarz, April 2013 [4] and available at http://www.rohde-schwarz-wireless.com/documents/LTELBSWhitePaper_RohdeSchwarz.pdf, for example. This architecture is also applicable to NR (in which case the base station 504 may be more frequently referred to as a gNobeB rather than an eNodeB).

It may be noted that in some implementations, the location server (LC) 306 may in effect be the same as the E-SMLC 344 because UE positioning may be implemented using a C-plane based solution (i.e. without using the U-plane). In more recent approaches, however, a U-plane solution may also be used (as enabled by SUPL 2.0 protocol, for example). In that regard, in accordance with embodiments of the present disclosure, the term "location server" may be used to include the use of both the C-plane case and U-plane case. More specifically, it will be appreciated a location server of certain embodiments may be provided in accordance with a proprietary standard/cloud service of a service provider. More generally, other such location services could be used. The location server of certain embodiments may sometimes be referred to as a "SUPL server". However, this should be understood to mean an SUPL server or suitable equivalent. In general, it is noted that, in 3GPP, the LPP protocol is defined between the UE 104 and location server 306. On the other hand, the Radio Resource Control (RRC) protocol is defined between the 104 UE and base station 101.

Thus, terminal devices operating in a wireless telecommunications system may make use of the approaches discussed above to use a location server to help establish position estimates for the terminal device, for example to support a navigation service. The location server may be used to help establish a position for the terminal device based on different position sensing technologies. For example, for a position sensing technology based on a GNSS receiver at the terminal device, the location server may be configured to provide ephemeris information for the satellite constellation which is more accurate than the ephemeris information that is otherwise currently available to the terminal device. For a position sensing technology based on barometric pressure measurements at the terminal device (e.g. to determine altitude), the location server may be configured to provide atmospheric pressure information for the terminal device to use to calibrate its barometric measurements. For a position sensing technology based on radio beacon detection, for example based on proximity to a Bluetooth low-energy beacon, the location server may be configured to provide location and identification information for the beacon(s). More generally, it will be appreciated for any of the many different positioning sensing technologies that may be adopted in accordance with embodiments of the disclosure, the location server may be configured to provide relevant positioning assistance information. Furthermore, it will be recognised the specific position sensing technologies used, and the specific nature of the assistance information provided by a location server, in accordance with certain embodiments of the disclosure is not of primary significance. Rather, what is of more significance for some example approaches is the manner in which a terminal device may be configured to make use of different ones of a plurality of position sensing technologies associated with its corresponding plurality of positioning circuits.

With the increased availability of position information for terminal devices, new services may be provided. Some of these services may rely on more precise positioning information than currently provided location-based services. For example, it is currently possible for a mobile device to help a user locate a shop in a particular town. For example, a user may identify a product they wish to obtain by browsing an Internet website associated with a particular shop. The user may then use a mapping application and GPS receiver in their terminal device to obtain directions to the shop. Typically a GPS receiver will provide positioning information with an accuracy on the order of 10 metres or so, and works best outdoors. This means while GPS may guide a user to the shop itself, it is not generally able to provide the user with guidance to a specific location for a particular product of interest within the shop.

In accordance with embodiments of the disclosure, a terminal device supports a plurality of different position sensing technologies and may use different ones at different times. For example, the terminal device may use GPS (or other GNSS) to bring the user to a shop, but may then use a different positioning sensing technology to direct the user to a location for the product of interest within the shop, for example based on a barometric pressure sensor to determine whether the user is on the correct floor of the shop or needs to go up or down, wifi-based (WLAN) position estimates to determine when the user is in the correct area of the relevant floor in the shop, and a Bluetooth beacon sensor to determine when the user is within beacon detection range of a short-range beacon associated with the product of interest.

Thus certain embodiments of the disclosure relate to what might be referred to as hybrid positioning techniques, i.e. approaches using a combination of more than one positioning method/technique, for example including one or more of:

a global navigation satellite system, GNSS, positioning technique;

a wireless local area network, WLAN, positioning technique;

a radio network access node identifier positioning technique, e.g. using cell ID/eCID;

a radio network access node ranging positioning technique, e.g. using OTDOA;

a radio beacon positioning technique, e.g. using BTLE beacons;

a gyroscopic/inertial positioning technique, e.g. using solid state inertial sensors; and a barometric pressure measurement positioning technique, e.g. using a pressure sensor.

It will be appreciated these different example positioning techniques are generally associated with different degrees of positioning accuracy and areal extents. For example, GNSS may have an accuracy of around 10 m and can be generally used across the entire surface of the Earth, but may work relatively poorly indoors. Techniques based on detecting radio network access node identifiers, e.g. cell ID, may provide an indication of a location to an accuracy corresponding to cell size (e.g. a few hundred metres) and may be used across a wireless telecommunication system, potentially using additional positioning information, for example briefly activating GNSS to resolve potential ambiguities arising from identifier reuse in a system. As another example, WLAN ranging techniques may provide accuracy on the order of several metres, and can be used wherever an appropriate WLAN is deployed, including indoors. Techniques based on radio beacon positioning, e.g. using BTLE beacons, may provide accuracy on the order of tens of cm and may be used when in range of where a beacon is deployed.

Table 1 below sets out some positioning technologies/methods currently proposed for 3GPP wireless telecommunications systems with an indication of the how these methods are expected to be implement. In this regard, UE-based refers to implementations in which a terminal device (UE) calculates its position itself using information received from the network, UE-assisted refers to implementations in which the network, e.g. at a location server, calculates the position of a terminal device based on measurements received from the terminal device (an external server may retrieve the position information and/or it may be transmitted to the terminal device), and Network-assisted refers to implementations in which more than one base station/functionality attached to more than one base station performs measurements which are sent to a location server to calculate the position of a terminal device (an external server may retrieve the position information and/or it may be transmitted to the terminal device). In addition to this, stand-alone positioning approaches refer to methods in which a UE performs measurement and estimate its position by itself without any support from the network/location server. For example, using only information received from satellites for GNSS positioning.

TABLE 1

Some currently proposed UE positioning methods support status.

| Positioning Method | UE-based UE estimates the position | UE-assisted location server estimates the position | network assisted location server estimates the position |
| --- | --- | --- | --- |
| Assisted-GNSS | Yes | Yes | No |
| OTDOA | Yes (REL-15) | Yes | No |
| Enhanced cell ID | No | Yes | Yes (direction of arrival) |
| UTDOA | No | No | Yes |
| Barometric | Yes (REL-14) | Yes | No |
| WLAN | Yes (REL-14) | Yes | No |
| Bluetooth | No | Yes | No |
| Terrestrial Beacon System (TBS) | Yes (REL-14) | Yes | No |

For 3GPP based Bluetooth positioning, current proposals support UE-assisted (E-SMLC-based) Bluetooth positioning. As indicated in table 8.8.2.1-1 in 3GPP TS 36.305 V14.2.0 (2017-06) [5], proposals are for the UE to send Bluetooth location information, such as MAC address (beacon ID) to a location server (E-SMLC). The UE transfers Bluetooth Location Information to location server (E-SMLC) in cases of UE-assisted positioning methods (i.e. UE location is not transferred). On the other hand, UE transfers UE Location Information to the location server in cases of standalone positioning methods.

The location server has a database of beacon access points and uses this to estimate the position of the UE. For example, a location server may generate a query for the database with a beacon ID as input, then the database may respond with the corresponding location. The location server may then send an indication of the position to the UE. In some situations a UE may not be able to communicate with a location server, for example when channel quality is poor. In accordance with certain embodiments of the disclosure, the location server may provide assistance information including a trigger criterion for Bluetooth receiver activation and mapping between Bluetooth ID and location (e.g. geographic coordinates or other information which defines the location (e.g. the building name and floor). This can help provide UE-based Bluetooth positioning and may provide power saving of UE.

Stand-alone based Bluetooth positioning is another implementation that uses Bluetooth beacons outside of 3GPP REL-13. With examples of this approach a UE application activates its Bluetooth receiver by itself (i.e. stand-alone positioning). However, this typically requires the application to be running (i.e. foreground running). When the application is running in the background or is dormant state (this behaviour depends on the UE's operation system functionality), the Bluetooth receiver may be disabled/subject to measurement disruption. If the application is to estimate an accurate position from a received Bluetooth ID, the database of all beacon locations and correspondingly allocated IDs should be stored in the US database. This can be challenging in view of the possible number of beacons. For example, hundreds of beacon might be installed in a single building, and the target building could be one of many. In view if this it may be preferable if the application can confine to the target area in a small zone. In currently proposed solutions, a customized application for a limited shop/area is commonly used. The application may thus connect to the specific application server and send a detected beacon ID. The application server may then provide the beacon location based on ID or trigger to launch the service (e.g. mobile coupon). The specific application is installed in advance and the user activates that application in the shop (then, Bluetooth receiver is on). The UE should also be able to communicate to the network when the UE detects the Bluetooth ID. To meet these conditions to implement this approach is not in general conducive to low UE power consumption.

Based on this, a preferable Bluetooth approach in some cases may be one that: (i) does not relay on cellular coverage, channel quality, or network connection; (ii) does not rely on a specific application to be installed and running; (iii) helps to reduce the database size relating Bluetooth beacon IDs and location mapping for the UE; (iv) to help support relatively low power consumption allows the UE to activate its Bluetooth receiver when near the target without needing to receive an instruction from the location server or network application, and certain approaches in accordance with some of the principles discussed herein can help in at least some of these regards.

Certain embodiments of the disclosure as discussed herein can help to provide approaches that provide a compromise between accuracy of positioning and UE power consumption for positioning. In general, relatively more accurate positioning methods (e.g. Real Time Kinematics Precise point positioning, RTK-PPP) can often require relatively more power consumption for a UE. In addition, assistance information for RTK-PPP is typically much larger than for conventional A-GNSS, with assistance information typically having a shorter validity time smaller validity area. Conversely, relatively low accuracy positioning methods (e.g. using enhanced cell ID) are often associated with relatively low power consumption for the UE. A UE supporting plural positioning methods/techniques may thus use different techniques at different times to seek to balance the frequently competing requirements of positioning accuracy and power consumption. For example, RTK-PPP may be used when the UE is near a target location (where available), but not when the UE is still relatively far from the target location. This kind of approach may be referred to as multi-level or multi-stage positioning, and certain embodiments of the disclosure relate to such approaches.

Based on the above discussion, a preferable GNSS positioning approach in some cases may be one for which: (i) the UE does not receive an excessive amount of assistance information for PPP; (ii) the UE does not have expired (obsolete) assistance information; and (iii) the UE has relatively low power consumption, for example the UE should aim to not stay in connected mode for too long and to be selective of when it uses PPP, and certain approaches in accordance with some of the principles discussed herein can help in at least some of these regards.

An example approach in accordance with certain embodiments of the disclosure will be described in the context discussed above in which a user may wish to be directed to a specific location in a shop, for example to purchase an item of interest identified from browsing an Internet website for the vendor of the product. However, it will be appreciated the specific scenario in which certain embodiments of the disclosure are implemented, for example in terms of why a user may wish to navigate to a particular target location, is not of primary significance to the principles described herein.

Approaches in accordance with certain example implementations adopt a multi-level/multi-stage positioning methods in which different ones of a plurality of positioning techniques supported by a terminal device are used as the terminal device gets closer to a target location. In that regard the general strategy may be seen as one in which a terminal device which is relatively far from the target location may use a first positioning technique which is relatively inaccurate but consumes relatively low power, and as the terminal device gets closer to the target location it may be triggered to start using a second positioning technique which consumes more power, but is more accurate. In some cases the first and second positioning techniques may be based on different position sensing technologies. For example, the first position sensing technique may be a GNSS technique and the second positioning technique may be a WLAN technique. However, in other cases the second positioning technique may in some respects be considered a modified/supplemented version of the first positioning technique. For example, the first positioning technique may be a GNSS technique and the second positioning technique may be a GNSS technique in which measurements are made more frequently than with the first positioning technique, or which are supplemented with additional sensor information, for example a barometric sensor to facilitate an altitude determination, or infrared sensor to facilitate a temperature detection (for example if the target location is associated with a hot or cold temperature—for example a refrigerator in a shop).

Thus higher accuracy positioning may provide further location based services and make further usage of sensors. For example, it may be determined that a user is standing in front of item in a shop. Further assistance information may suggest to activate sensors to recognize the user behaviour. For example, the UE may activate a e-compass or gyro-sensor when at the location of interest, so the UE may estimate what the user is looking at and the direction of their attention, or estimate motion. This may be especially useful for wearable type devices like glasses or a watch, for example.

Figure 4:
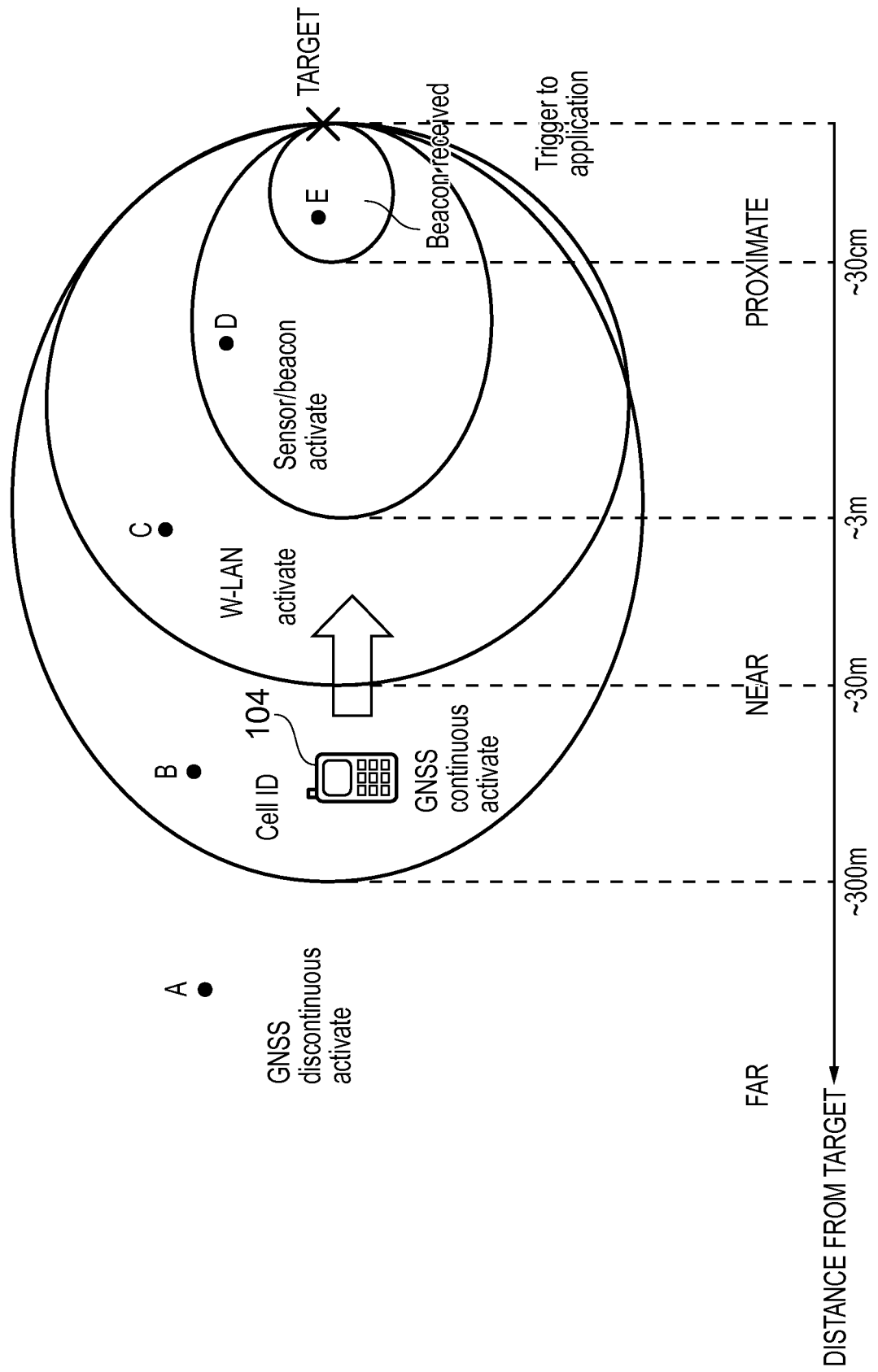
FIG. 4 schematically shows an example implementation scenario of an approach in accordance with an example embodiment of the present disclosure.

FIG. 4 schematically represents an implementation scenario of an approach in accordance with certain embodiments of the disclosure. It will be assumed a user starting at location A wishes to use their terminal device to navigate towards a target location represented as X in FIG. 4. The axis along the bottom of FIG. 4 schematically represents a distance from the target (non-linear scale). The distance between the UE and the target may be broadly categorised as far, near and proximate, as schematically indicated in the figure. Different positioning techniques may be considered more appropriate for different ranges, for example as follows:

Greater than a few hundreds of metres (e.g. at location A in FIG. 4): When the current UE position is far from the target location/point of interest (POI), the UE may be configured to use a relatively low accuracy/fidelity positioning method with relatively low power consumption. E.g. cell-id based, or based on discontinuous GNSS detection, for example making GNSS measurements only once every minute or so.

Between a few hundreds of metres and a few tens of metres (e.g. at location B in FIG. 4): When the current UE position is in this kind of range from the target location, the UE may be configured to use a higher accuracy positioning method associated with a higher power consumption. E.g. based on more frequent GNSS measurements, for example making measurements once every few seconds or continuously.

Between a few tens of metres and a few metres (e.g. at location C in FIG. 4): When the current UE position is in this kind of range from the target location, the UE may be configured to use a more reliable/accurate indoor positioning method associated with a higher load/cost for use, e.g. in terms of relying on relatively large amounts of assistance information, more frequent updating of assistance information, relatively high power consumption (e.g. WLAN) and/or radio communication (e.g. connected mode operation), and so on.

Below a few metres (e.g. at location D in FIG. 4): When the current UE position is in this kind of range from the target location (e.g. in the immediate vicinity), the UE may be configured to use a more localised positioning method, for example based on detecting signalling from a BTLE beacon that is close to the target location to indicate when the UE is in range of the BTLE beacon. Thus a user within a few metres of the target location the user may be expected to move around the general area to wait to see when the UE has detected the BTLE beacon (e.g. when at location E in FIG. 4), which may have a range of the order of a few tens of centimetres, for example. For example, for a detected beacon ID the UE can use its position and transmit power to estimate accurate position. In another example, the UE may receive signalling from more than one BTLE beacon for which the UE knows the corresponding beacon ID and position from assistance information, to further help positioning accuracy.

In short, in accordance with certain embodiments of the disclosure an appropriate positioning technology (e.g. sensor) may be selected for use from those available having regard to the proximity to the target location/point of interest.

It will be appreciated that when the terminal device start using a new positioning technique as it approaches the target location, it may use the new technique instead of or in addition to the previously used technique depending on the implementation at hand.

It will also be appreciated the identification of specific distances for the above discussed ranges and the proposed positioning techniques within these ranges are provided here merely by way of example, and in any given implementation the appropriate distances from the target location at which to start using a different positioning system will vary depending, for example, on the extent to which the terminal device needs to preserve power and the relative accuracy of the different positioning technologies the terminal device supports.

As discussed further herein, one aspect of certain embodiments of the disclosure is how a location server in a wireless telecommunications network, e.g. the location server 306 represented in FIGS. 1 to 3, may facilitate the process of a terminal device navigating to a target location, for example by providing positioning assistance information to supplement positioning measurements made by the terminal device in the context of a multi-level/multi-stage process of the kind discussed above. In this regard, it will be appreciated the manner in which the positioning assistance information is used to supplement positioning measurements made by the terminal device to derive a location for the terminal device may be in accordance with conventional approaches for assisted positioning in wireless telecommunications systems. That is to say, what is significant is not the nature of the specific positioning sensing techniques and the specific positioning assistance information used to derive particular locations for the terminal device, but the manner in which these approaches may be implemented in a multi-level/multi-stage positioning/navigation process of the kinds discussed herein.

Providing the assistance information could be in either a single step or multiple stages. By single step it is meant the location server may provide assistance information for multiple stages in one step. However, in some cases it may be preferable for a multi-stage approach for providing assistance information to be used. For example, the validity time for assistance information could be short. For example, the assistance information for GNSS with RTK-PPP could be shorter validity time than that for normal GNSS so it may be preferable to receive it just before needing it, otherwise, it could be obsolete when the UE uses it. Also, the volume of assistance information could in some cases be large. For example, if the Bluetooth beacons are installed an airport shopping mall, the number of beacons for the whole building could be hundreds to thousands requiring the UE to maintain a large database/record of assistance information if the information is not provided in stages. Furthermore, a possible combination of assistance information could be too much to send. For example, the possible route/course which a user takes could be more than one. If one step assistance information delivery is used, the location server may need to provide assistance information which for all the potential route/courses, some of which will never be needed.

Thus, one approach in accordance with embodiments of the disclosure for the scenario represented in FIG. 4 may be implemented in a number of steps as follows.

When the UE 101 is at location A, it is initially configured to navigate towards target location X. That is to say, the UE establishes a target location, for example in response to user input. In principle the user may enter specific coordinates for location X, but in practice it may be more likely that these coordinates are obtained quasi-automatically, for example by the user indicating in a web browsing session that the user wishes to obtain a particular product, with the web browser then providing the coordinate information to the navigating function of the terminal device directly (the navigation function may be a separate application running on the terminal device or a sub-function of the web browser, for example).

In this example it is assumed the terminal device is configured to initially use its GNSS receiving circuitry to establish its initial location (i.e. location A in the example of FIG. 4). Furthermore, the terminal device is configured to receive positioning assistance information from the location server for the terminal device to use in conjunction with its GNSS measurements to determine location information. In this example the terminal device may receive this information by transmitting a request for the information to the location server, via a base station to which the terminal device is currently connected. In accordance with some example implementations the terminal device may also provide the location server with an indication of the target location, and potentially an indication of its own location, for example based on non-assisted positioning estimates or its most recent previous estimate using positioning assistance information, to help the location server determine the most appropriate positioning assistance information to provide to the terminal device. When the terminal device has received the positioning assistance information and made measurements with its GNSS circuitry, it may determine its location and from this the distance to the target location. In this example scenario the UE is assumed to be far from the target location, for example greater than 300 metres, at location A. Based on the relatively large distance to the target location, the terminal device may determine that it should use its GNSS receiver in a discontinuous manner when providing location information to the user to help the user navigates to the target location.

However, the terminal device may also establish a trigger condition which, when satisfied, will cause the terminal device to activate a second more accurate positioning technique. In this example it is assumed the next stage positioning technique (i.e. having higher positioning accuracy/reliability but at the cost of higher power consumption) is GNSS continuous activation, and the terminal device is configured to activate this when it detects it is in the coverage area of a base station which covers the location of the target location. It will be appreciated that rather than GNSS continuous activation, GNSS discontinuous operation with a higher frequency may be used before or instead of GNSS continuous activation. The indication of the relevant cell ID for the base station which is to cause the terminal device to switch to GNSS continuous activation may be provided to the terminal device by the location server in association with the positioning assistance information. The location server may determine the appropriate cell ID from a preconfigured database of locations covered by the different radio network access nodes (base stations) comprising the wireless telecommunications system and the indication of the desired target location received from the terminal device. In another example the trigger condition may be such that the terminal device determines it should switch to continuous GNSS activation when it is within a given distance, for example 300 metres, of the target location. This threshold distance may be preconfigured for the terminal device, or provided to the terminal device in association with positioning assistance information in a similar manner to that discussed above for the cell ID. For a trigger condition based on detecting a specific cell ID, the condition may also include a requirement for a signal strength/quality characteristic (e.g. RSRP/RSRQ) and/or direction of signal arrival (beamforming direction) to meet a predefined condition. For example there may be a requirement for the terminal device to receive signalling from the network access node associated with the relevant cell ID with at least a threshold power level, or from a particular direction (e.g. indicting network access node is in broadly the same direction as the target location) before the trigger condition is deemed to be satisfied. Here the trigger condition may be judged by the terminal device depending on whether the current positioning technique is available or not at the position (e.g. the terminal device may switch to WLAN based positioning technique if out of coverage of GNSS signal, for example because it is indoors or the like). Furthermore this judgement of the trigger condition may include activating other positioning technique (e.g. turning on dedicated sensors).

The terminal device may thus monitor for when the trigger condition is satisfied, and when it is determined the trigger condition is satisfied (e.g. when the terminal device starts to receive signalling from the network access node associated with the relevant cell ID or it is determined to be within the predetermined threshold distance of the target location depending on implementation), the terminal device may start using the next stage positioning technique to determine its location. Depending on implementation, this may involve obtaining updated positioning assistance information for use with the new positioning technique. In some cases the terminal device may not require updated positioning assistance information, for example because it already has relevant assistance information for GNSS positioning, but may nonetheless obtain positioning assistance information in accordance with certain embodiments of the disclosure to provide an indication of the next trigger condition for switching to the next level/stage positioning technique.

The general process discussed above may continue for different stages of the multi-stage approach. For example, the terminal device may be configured to switch to WLAN positioning, and to obtain relevant positioning assistance information, when the next trigger condition is met, which may be that the terminal device is determined to be within a different threshold distance of the target location, for example 30 metres, or when it is determined the terminal device is about to enter a building. This may be determined, for example, because the location server set the trigger condition based on a known location for the entrance to a building containing the target location. Thus, the terminal device may start using a WLAN positioning technique to guide the user towards the target location. Furthermore, when the next trigger condition is met, for example when the terminal device is within three metres of the target location, the terminal device may be configured to activate the next level of positioning in the multi-stage approach. In this example this is considered to be seeking a radio beacon associated with the target location, for example a BTLE beacon, wherein the identifier for the BTLE beacon associated with the target location is provided to the terminal in device positioning assistance information. For example, the terminal device may be configured to request new positioning assistance information whenever it is triggered to switch to a different position sensing technology.

There are different ways in which the terminal device 104 may obtain positioning assistance information, and in particular an indication of the trigger conditions for activating different positioning techniques, from the location server 306. One way is using a data radio bearer (DRB), as schematically indicated in FIG. 5, while another way is using an on-demand system information (SI) technique, as schematically indicated in FIG. 6.

Figure 5:
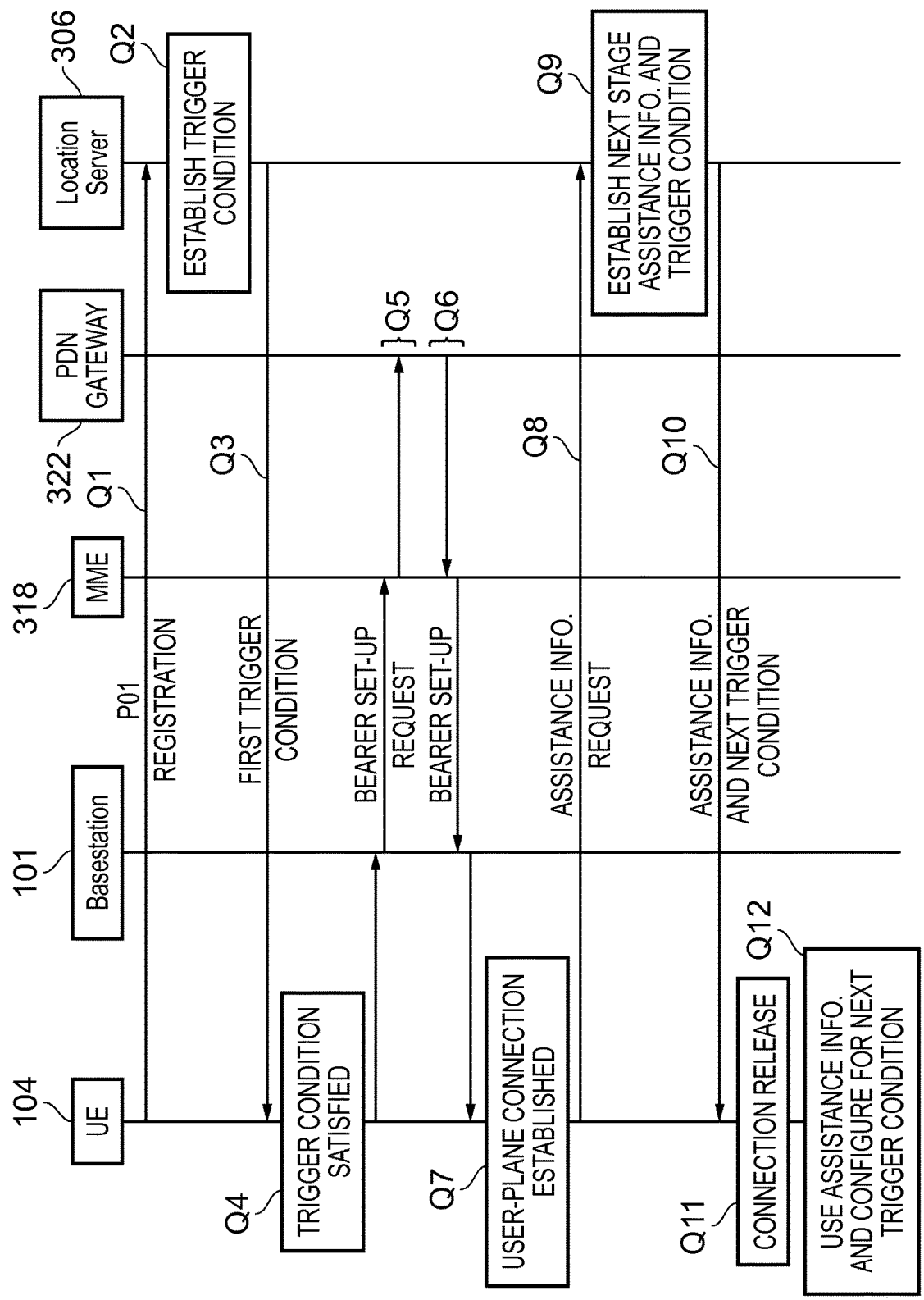
FIGS. 5 and 6 are signalling ladder diagrams (message sequence charts) schematically representing some operating aspects of wireless telecommunications systems in accordance with certain embodiments of the disclosure.
Figure 6:
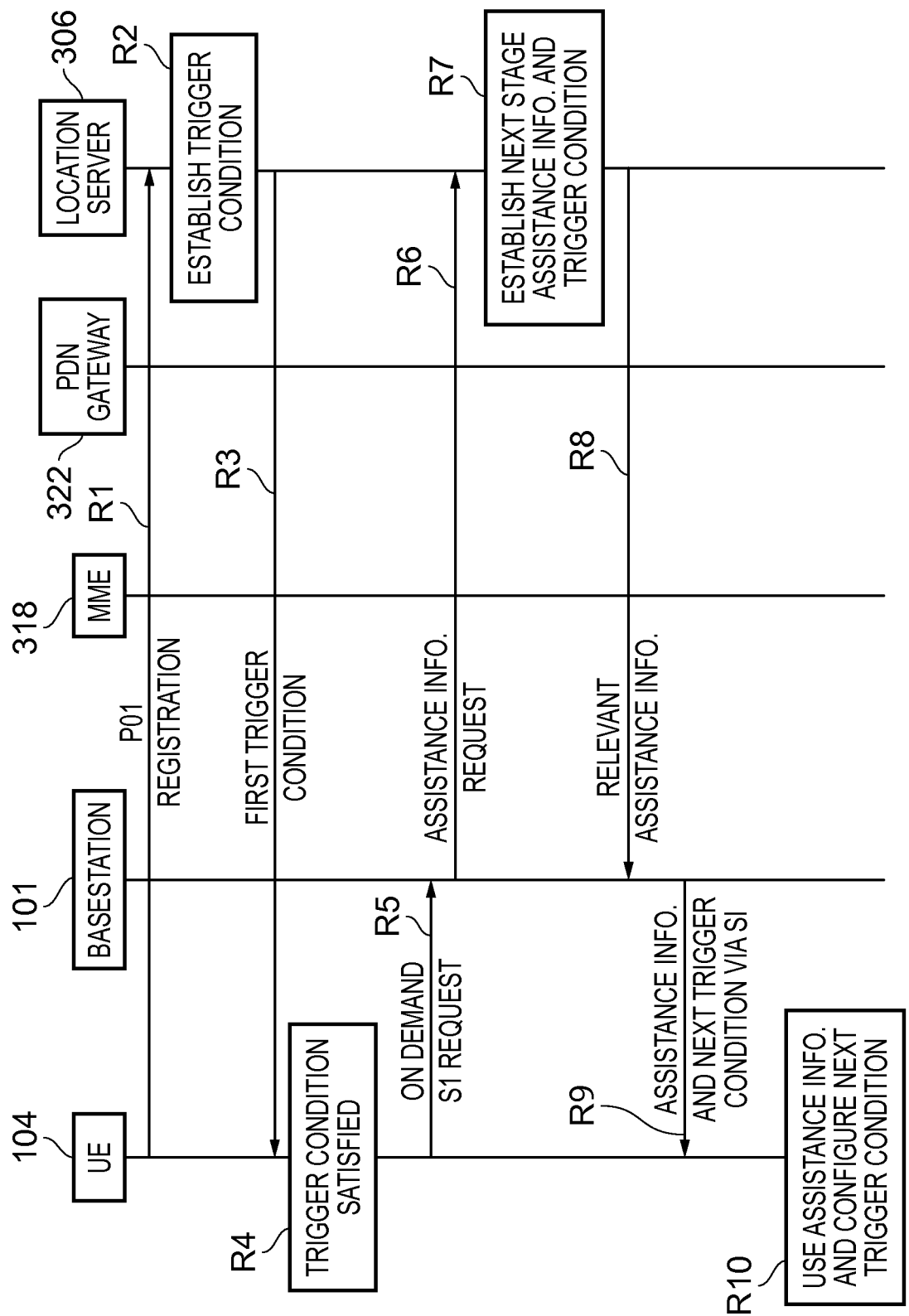

FIG. 5 is a ladder diagram schematically representing some operating aspects of the wireless telecommunications system 100 discussed above with reference to FIGS. 1 to 3 in accordance with certain embodiments of the disclosure. In particular, the diagram represents some operations and signalling exchange associated with the terminal device 104, the network access node/base station/eNB 104, the MME 318, the PDN gateway 322, and the location server 306 in accordance with certain embodiments of the disclosure.

In step Q1 the UE 101 sends an indication of the target location (POI) to location server 306. The UE may also send capability to location server. UE may indicate the POI via an external server, such as an LBS (location based service) server. For example, the user may use a map/navigation application with a smart phone to identify the POI and the application server may indicate it to SUPL server.

In step Q2 the location server generates the first trigger condition based on the target location. The first trigger condition may, for example, be based on defining a relatively large geo-fence zone around the target location/building containing the target location (POI) using SUPL 2.0 geo-fencing, and in condition may be considered satisfied if the terminal device determines it has entered the geo-fenced zone. As another example the trigger condition may relate to an identifier for a radio access node (e.g. cell ID) or Wi-Fi access point (this may require new information element in the positioning assistance data to convey the relevant information). It may be noted that in some implementations this kind of trigger condition information could be preconfigured at the terminal device instead of being received from the location server.

In step Q3 the location server transmits an indication of the first trigger condition to the terminal device. As noted above, in some cases the terminal device may establish the trigger condition itself, for example based on an internally established geo-fence, in which case steps Q1 and Q2 may be omitted.

SUPL 2.0 triggered services may assume a relatively large zone for geo-fencing, for example corresponding to cell-ID or WLAN and conventional GNSS. In general, the practical radius of geo-fencing may be considered to be on the order of a 50-100 m range. If a smaller area is defined, it may lead to an undesirable number of false/miss-detection events. Thus while geo-fencing mat help guide a user to an outdoor zone near a target building/POI, it is not always suitable for use inside buildings. On the other hand, there may be applications for which a terminal device would benefit from sub-meter level precise positioning, such as maybe achieve with RTK-PPP GNSS or Bluetooth beacons. The assistance information for these may be valid for a relatively small area/short timing window. In these cases procedures for providing assistance information such as through on-demand SI may be considered appropriate.

The UE now continues to generate location information for its own position in accordance with the relevant positioning technique for the present stage (e.g. using discontinuous GNSS for the first stage, i.e. with the UE at location A, represented in FIG. 4) to guide the user towards the target location. In addition the UE monitors for when the trigger criterion is satisfied, which in this example is assumed to occur in step Q4.

In step Q4 the UE 101 detects the trigger (e.g. geo-fence) is satisfied, and then in step Q5 the UE initiates establishment of EPS bearer between UE and P-GW 322. P-GW establish the EPS bearer in response to the UE initiation. The procedures of RRC connection may be in accordance with conventional procedures, for example as set out in 3GPP TS 36.331 V14.2.2 (2017-05) [6], and details of the Core network procedures for UE triggered Service Request may be in accordance with conventional procedures, for example as set out in 3GPP TS 36.401 V14.0.0 (2017-03) [7]. UE may use the signalling bearer (SRB) if location server in in C-plane.

In step Q7, the EPS bearer is established between UE and location server (it is assumed that the location server is connected to P-GW with IP network).

In step Q8, UE sends the request of assistance information (or current location).

In step Q9, the location server generate the assistance information and next trigger.

In step Q10, the location server sends the assistance information for next positioning methods and the further trigger condition.

In Step Q11, the network release the EPS bearer.

In Step Q12, the UE uses the received assistance information and starts using the next positioning methods and configures the further trigger condition.

Current proposals for using positioning assistance information do not incorporate the ability to communicate an indication of a trigger condition for activating a new positioning technique/obtaining further positioning assistance information when sending a positioning assistance information message (ProvideAssistanceData) (see, for example TS 36.355 [8]). Therefore it is proposed in accordance with certain embodiments of the disclosure to introduce a new information element into the positioning assistance information signalling message, for example which may be called "provideTriggerForFurtherAssistanceData", for example. The contents of this information element may, for example, include the relevant cell ID, an associated RSRP, the relevant threshold distance, and so on according to the nature of the specific trigger condition. For example the new information element may be implemented as follows:

```
ProvideAssistanceData : := SEQUENCE {
    criticalExtensions        CHOICE {
        c1                    CHOICE {
            provideAssistanceData-r9 ProvideAssistanceData-r9-IEs,
            provideTriggerForFurtherAssistanceData,
            spare3 NULL, spare2 NULL, spare1 NULL
        },
        criticalExtensionsFuture     SEQUENCE { }
    }
}
```

Furthermore, current proposals for using positioning assistance information do not incorporate the ability for an assistance information request (RequestAssistanceData) message to show whether the request is for positioning assistance information for a currently used positioning technique or for a different positioning technique. Therefore it is proposed in accordance with certain embodiments of the disclosure to introduce a new information element into the request assistance data signalling message, in some examples this may indicate the specific positioning technique, whereas in other examples it may simply indicate the relevant stage number of a pre-defined multi-level positioning method, and may, for example be called "stage". This the new information element may, for example, be implemented as follows

```
-- ASN1START
RequestAssistanceData : := SEQUENCE {
    criticalExtensions        CHOICE {
        c1                    CHOICE {
            requestAssistanceData-r9 RequestAssistanceData-r9-IEs,
            Stage,             Stage,
            spare3 NULL, spare2 NULL, spare1 NULL
        },
        criticalExtensionsFuture     SEQUENCE { }
    }
}
```

Furthermore still, current proposals for using positioning assistance information do not incorporate the ability to include an indication of a trigger condition for activating a sensor, such as gyroscope sensor, a barometric sensor, a temperature sensor, or an image/camera sensor, when sending a positioning assistance information for a sensor message (Sensor-ProvideAssistanceData). Therefore it is proposed in accordance with certain embodiments of the disclosure to introduce a new information element into the positioning assistance information for a sensor signalling message, for example which may be called "sensor-AssistanceDataTriggerCondtion", for example. The contents of this information element may, for example, include the relevant cell ID, an associated RSRP, the relevant threshold distance, and so on according to the nature of the specific trigger condition. For example the new information element may be implemented as follows:

```
-- ASN1START
Sensor-ProvideAssistanceData-r14 : := SEQUENCE {
    sensor-AssistanceDataList-r14     Sensor-AssistanceDataList-r14
        OPTIONAL,     -- Need ON
    sensor-Error-r14                  Sensor-Error-r13
        OPTIONAL,     -- Need ON
    sensor-AssistanceDataTriggerCondtion
    sensor-AssistanceDataTriggerCondtion     OPTIONAL,     -- Need ON
    ...
}
-- ASN1STOP
```

FIG. 6 is a ladder diagram schematically representing some operating aspects of the wireless telecommunications system 100 discussed above with reference to FIGS. 1 to 3 in accordance with certain embodiments of the disclosure. In particular, the diagram represents some operations and signalling exchange associated with the terminal device 104, the network access node/base station/eNB 104, the MME 318, the PDN gateway 322, and the location server 306 in accordance with certain embodiments of the disclosure. It will be appreciated a number of the steps in FIG. 6 are similar to and will be understood from the above description of corresponding steps in FIG. 5.

In step R1 the UE 101 sends an indication of the target location (POI) to location server 306.

In step R2 the location server generates the first trigger condition based on the target location. The first trigger condition may, for example, be based on defining a relatively large geo-fence zone around the target location/building containing the target location (POI) using SUPL 2.0 geo-fencing, and in condition may be considered satisfied if the terminal device determines it has entered the geo-fenced zone. As another example the trigger condition may relate to an identifier for a radio access node (e.g. cell ID) or Wi-Fi access point (this may require new information element in the positioning assistance data to convey the relevant information). It may be noted that in some implementations this kind of trigger condition information could be preconfigured at the terminal device instead of being received from the location server.

In step R3 location server transmits an indication of the first trigger condition to the terminal device. As noted above, in some cases the terminal device may establish the trigger condition itself, for example based on an internally established geo-fence, in which case steps R1 and R2 may be omitted.

The UE now continues to generate location information for its own position in accordance with the relevant positioning technique for the present stage (e.g. using discontinuous GNSS for the first stage, i.e. with the UE at location A, represented in FIG. 4) to guide the user towards the target location. In addition the UE monitors for when the trigger criterion is satisfied, which in this example is assumed to occur in step R4.

In step R5, in response to the UE detecting the first trigger condition is met, the UE sends a request for on-demand SI (e.g. using a random access procedure) to the base station and in step S6 the base station sends an assistance information request message to the location server 306.

The request for on-demand SI in this example may be made generally in accordance with previously proposed techniques, but modified to include an indication of the positioning technique in respect of which the positioning assistance information is sought. This may be a specific indication of the relevant positioning technique or an indication of the relevant stage/level in a pre-defined multi-level hierarchy of positioning techniques (e.g. as proposed above).

In step R7 the location server determines the relevant positioning technique for the next stage of the multi-level positioning and the associated trigger condition for the next stage after that and also the relevant assistance information for the next stage of the multi-level positioning procedure.

In step R8 the location server sends the relevant assistance information to the base station.

In step R9 the base station transmits the relevant assistance information to the terminal device in system information.

In Step R10, the UE uses the received assistance information and starts using the next positioning method(s) and configures the further trigger condition.

Thus in accordance with some examples of the present disclosure a network may send a terminal device assistance information for hybrid positioning that includes trigger conditions for changing positioning method.

Thus, to summarise some of the key points of approaches in accordance with some examples of the invention, which may each be implemented independently of each other:

A UE may send an assistance information request based on a previous configured/pre-defined trigger condition being satisfied. In some examples the trigger of next level assistance information may be provided by the previous assistance information or pre-configuration. In some examples the UE does not indicate the specific positioning method in the request and the location server decide it itself.

A UE may receive the assistance information in response to its request. In some examples, In some examples current assistance information and next assistance information may be for different positioning methods/techniques. On some examples the assistance information is associated with a trigger condition for the next level request. The UE may use the received assistance information for hybrid positioning.

The assistance information may indicate the terminal should use a combination of more than one positioning methods (techniques) or sensors.

A location server may receive the assistance information request from UE via a base station. The assistance information request may be triggered according to a condition associated with the previous assistance information or pre-configured (e.g. a geo-fence). In some examples the assistance information request may include a one bit information element to indicate a request for assistance information for the next stage of a multi-level/hierarchical positioning method. This single-bit approach may be particularly helpful for requesting positioning assistance information using on-demand SI as smaller amounts of data can be more readily conveying in a preamble associated with requesting on-demand SI. In other cases the assistance information request may include a more bits of information to indicate a request for assistance information for a specific positioning technique.

The location server may generate the relevant assistance information. In doing this, account may be taken of, for example: the target location (POI) for the UE and/or the UE's current position or geo-fence status and/or UE measurement results (e.g. RSCP) and/or UE positioning sensor values (e.g. barometer).

The location server sends the assistance information to UE via the base station. A Transaction End Flag for the assistance information may indicate the end of information for this level of positioning. The assistance information may be communicated via on-demand system information or via a data radio bearer (DRB).

The terminal device may in some cases be separately configured with each of the multi-level trigger conditions with assistance information, although the approaches discussed above have focused on multi-stage assistance information provision.

Figure 7:
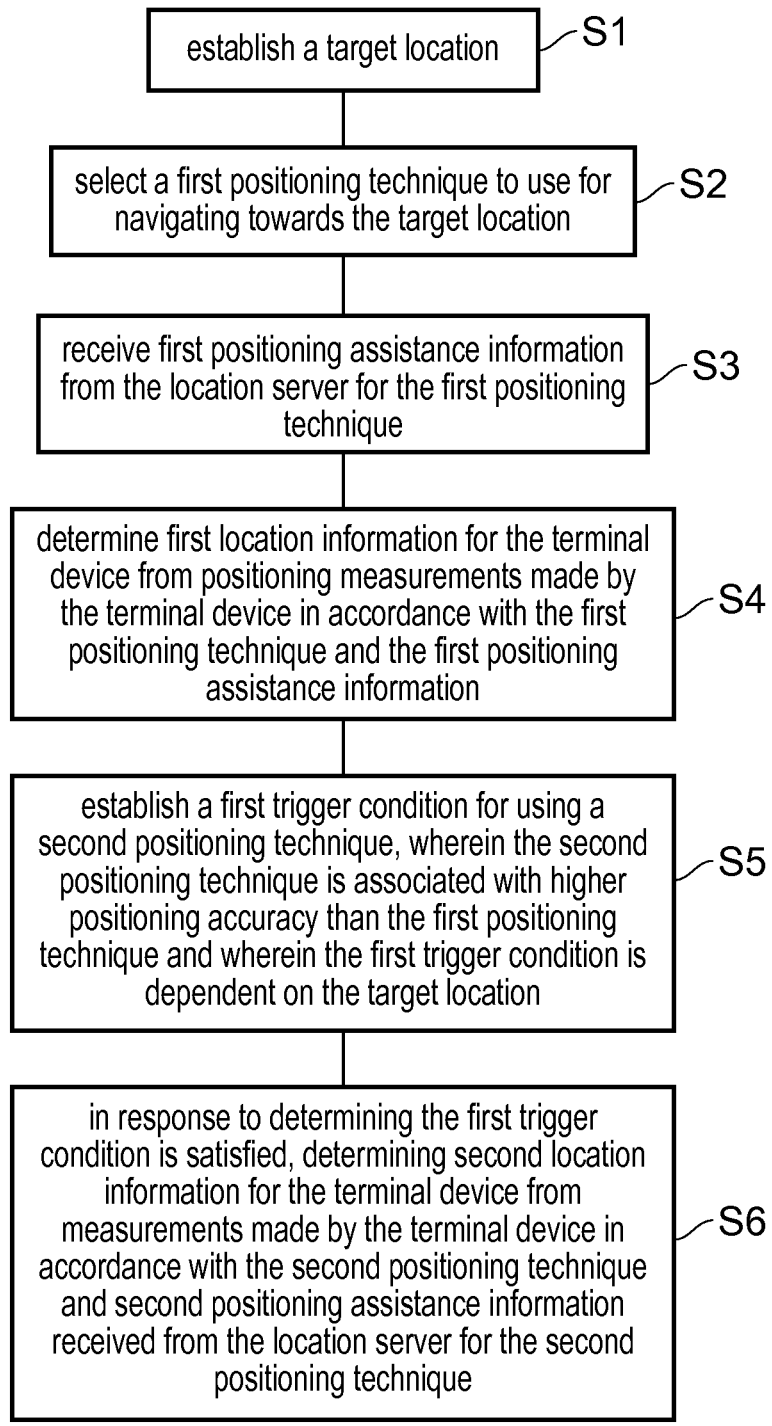
FIG. 7 is a flow diagram schematically representing some operating aspects of a terminal device in accordance with certain embodiments of the disclosure.

FIG. 7 is a flow diagram schematically representing some operating aspects of a terminal device in accordance with certain embodiments of the disclosure.

The method of FIG. 7 is performed by the terminal device 101 to provide a navigation function in a wireless telecommunications system 100 comprising the terminal device 101 and a location server 306, wherein the terminal device supports a plurality of positioning techniques which use positioning measurements made by the terminal device and positioning assistance information received from the location server to determine location information for the terminal device.

In step S1 the terminal device establishes (identifies) a target location, for example based on user input.

In step S2 the terminal device selects a first positioning technique to use for navigating towards the target location. This may be selected according to a predefined multi-stage positioning approach in accordance with a current positioning stage for the terminal device, or based on an indication of which positioning technique to use received from the location server, for example.

In step S3 the terminal device receives first positioning assistance information from the location server for the first positioning technique. This may be received, for example, using on-demand system information or a dedicated data radio bearer. In some cases the positioning assistance information may be received from the location server in response to the terminal transmitting a request for the positioning assistance information to the location server. In other examples the terminal device may receive the positioning assistance information from the location server without transmitting a request for the positioning assistance information to the location server.

For example the location server may autonomously determine to send the positioning assistance information to the terminal device, e.g. based on positioning information for the terminal device being received at the location server which indicates the terminal device is moving towards a location where it may be triggered to use a positioning technique that relies on the positioning assistance information.

In step S4 the terminal device determines first location information (i.e. one or more position estimates) for the terminal device from positioning measurements made by the terminal device in accordance with the first positioning technique and the first positioning assistance information.

In step S5 the terminal device establishes a first trigger condition for using a second positioning technique, wherein the second positioning technique is associated with higher positioning accuracy than the first positioning technique and wherein the first trigger condition is dependent on the target location. In some cases the trigger condition may be established by the terminal device from an indication of the first trigger condition received from the location server. For example, in some implementations the indication of the first trigger condition may be received from the location server in association with the first positioning assistance information, In step S6, in response to determining the first trigger condition is satisfied, the terminal device determines second location information for the terminal device from measurements made by the terminal device in accordance with the second positioning technique and second positioning assistance information received from the location server for the second positioning technique.

The second positioning assistance information may have been received by the terminal device in response to the terminal device requesting the information in response to determining the first trigger condition is satisfied. In some cases the second positioning assistance information may have been received by the terminal device before the first trigger condition is satisfied, for example it may have been pre-emptively provided by the location server. The second positioning technique may be selected according to a predefined multi-stage positioning approach in accordance with a relevant positioning stage for the terminal device, or based on an indication of which positioning technique to use received from the location server, for example in the first and/or second positioning assistance information.

It will be appreciate the method represented in FIG. 7 may be repeated for further stages in the multi-stage positioning process. That is to say, in some implementations the method represented in FIG. 7 may further comprise the terminal device establishing a second trigger condition for using a third positioning technique, wherein the third positioning technique is associated with higher positioning accuracy than the second positioning technique and the second trigger condition is also dependent on the target location; and, in response to determining the second trigger condition is satisfied, determining third location information for the terminal device from measurements made by the terminal device in accordance with the third positioning technique and third positioning assistance information received from the location server for the third positioning technique.

Figure 8:
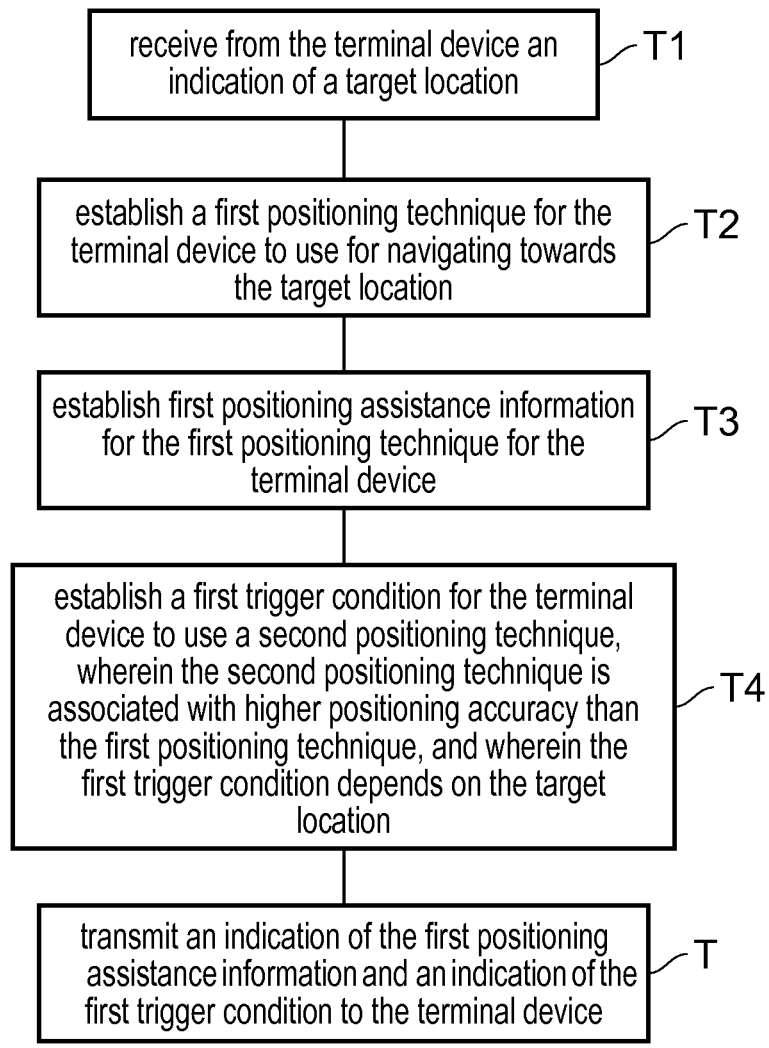
FIG. 8 is a flow diagram schematically representing some operating aspects of a location server in accordance with certain embodiments of the disclosure.

FIG. 8 is a flow diagram schematically representing some operating aspects of a location server in accordance with certain embodiments of the disclosure.

The method of FIG. 8 is performed by the location server to support a navigation function for the terminal device 101 in the wireless telecommunications system 100, wherein the location server is operable to provide the terminal device with positioning assistance information for the terminal device to use with positioning measurements made by the terminal device to determine location information for the terminal device in accordance with a plurality of positioning techniques.

In step T1 the location server receives from the terminal device an indication of a target location. The location server may also receive an indication of UE capability, for example in terms of the positioning techniques/methods and associated sensors the UE supports and/or an indication of the terminal device's currently estimated position. Alternatively, the terminal device may indicate a target location to an application server (e.g. a map/navigation website), and the application server may forward this to the location server (i.e. the indication of the target location may be received form the terminal device via an intermediate node).

In step T2 the location server establishes a first positioning technique for the terminal device to use for navigating towards the target location. In some cases the location server may determine a location for the terminal device, for example based on information received from the terminal device, and the first positioning assistance information may be established in dependence on the determined location for the terminal device. In some cases the location server may know the supported positioning methods near/inside it the POI. For example, whether the target building may have WIFI access points or Bluetooth beacons for positioning and/or if cellular coverage/other communication is available near the POI. In some examples, precise positioning GNSS may be available near the target, for example outdoors. Base on this knowledge or database of POI and available positioning methods, the location server may make a decision to use the multi-stage positioning.

In step T3 the location server establishes first positioning assistance information for the first positioning technique for the terminal device.

In step T4 the location server establishes a first trigger condition for the terminal device to use a second positioning technique, wherein the second positioning technique is associated with higher positioning accuracy than the first positioning technique, and wherein the first trigger condition depends on the target location.

In step T5 the location server transmits an indication of the first positioning assistance information and an indication of the first trigger condition to the terminal device. In some cases the location server may also transmit an indication of which of the plurality of positioning techniques is the second positioning technique to the terminal device.

In some cases the method represented in FIG. 8 may further include the location server establishing second positioning assistance information for the second positioning technique and transmitting an indication of the second positioning assistance information to the terminal device. The transmitting of the indication of the second positioning assistance information to the terminal device may in some cases be performed in response to receiving from the terminal device an indication the first trigger condition has been satisfied.

Thus there has been described a method of operating a terminal device to provide a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the method comprises: establishing (determining) a target location; selecting a first positioning technique to use for navigating towards the target location; receiving first positioning assistance information from the location server for the first positioning technique; determining first location information for the terminal device from positioning measurements made by the terminal device in accordance with the first positioning technique and the first positioning assistance information; establishing a first trigger condition for using a second positioning technique, wherein the second positioning technique is associated with higher positioning accuracy than the first positioning technique and wherein the first trigger condition is dependent on the target location; and, in response to determining the first trigger condition is satisfied, determining second location information for the terminal device from measurements made by the terminal device in accordance with the second positioning technique and second positioning assistance information received from the location server for the second positioning technique.

In some cases, the method may further comprise, in response to determining the first trigger condition is satisfied, launching an application on the terminal device for a location based service. In some cases the first and/or second positioning assistance information includes information to support the application launched on the terminal device for a location based service.

In some cases, the second location information may comprises an indication of an identifier or display location for an object at the target location.

In some cases, first positioning assistance information may relate to RRC idle/inactive mode positioning while the second positioning assistance information may relate to RRC connected mode positioning. In some cases, first positioning assistance information may relate to positioning with less frequent measurement/position estimation than the second positioning assistance information. In some cases, first positioning assistance information may relate to positioning with lower power consumption operation than the second positioning assistance information.

With some positioning techniques a UE is conventionally expected to use RRC connected mode, for example to report a detected Bluetooth beacon ID to a location server. However, in accordance with some examples of the present disclosure, the positioning assistance information may include location information for beacon IDs in the vicinity of the POI/the beacon ID associated with a trigger condition such that the UE does not need to report this to the network and so may stay in an idle/inactive mode longer, thereby saving power.

In some cases, a trigger condition may correspond with a detection of moving from outdoor to indoor (e.g. based on loss of GNSS signalling). In some cases, a condition may be detection of a cell ID or WLAN access point which may indicate the UE is entering a relatively large zone like a shopping street. In some cases, a trigger condition may be a geo-fencing configuration by SUPL trigger.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard, including proprietary standards, and also wireless telecommunications systems that do not conform to a standard.

It may be noted various example approaches discussed herein may rely on information which is predetermined/predefined in the sense of being known by both the base station and the terminal device or other elements of a network. It will be appreciated such predetermined/predefined information may in general be established, for example, by definition in an operating standard for the wireless telecommunication system, or in previously exchanged signalling between the relevant network elements, for example in system information signalling, or in association with radio resource control setup signalling/application layer signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device to provide a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the method comprises: establishing a target location; selecting a first positioning technique to use for navigating towards the target location; receiving first positioning assistance information from the location server for the first positioning technique; determining first location information for the terminal device from positioning measurements made by the terminal device in accordance with the first positioning technique and the first positioning assistance information; establishing a first trigger condition for using a second positioning technique, wherein the first trigger condition is dependent on the target location; and, in response to determining the first trigger condition is satisfied, determining second location information for the terminal device from measurements made by the terminal device in accordance with the second positioning technique and second positioning assistance information received from the location server for the second positioning technique.

Paragraph 2. The method of paragraph 1, wherein the first trigger condition is established by the terminal device from an indication of the first trigger condition received from the location server.

Paragraph 3. The method of paragraph 2, wherein the indication of the first trigger condition is received from the location server in association with the first positioning assistance information.

Paragraph 4. The method of any one of paragraphs 1 to 3, wherein the terminal device receives at least one of the first and second positioning assistance information from the location server in response to transmitting a request for the at least one of the first and second positioning assistance information to the location server.

Paragraph 5. The method of any one of paragraphs 1 to 4, wherein the terminal device receives at least one of the first and second positioning assistance information from the location server without transmitting a request for the at least one of the first and second positioning assistance information to the location server.

Paragraph 6. The method of any one of paragraphs 1 to 5, wherein the terminal device receives at least one of the first and second positioning assistance information in system information transmitted by a radio network access node in the wireless telecommunications system.

Paragraph 7. The method of any one of paragraphs 1 to 6, wherein the second positioning assistance information is obtained from the location server before determining the first trigger condition is satisfied.

Paragraph 8. The method of any one of paragraphs 1 to 7, wherein the first and/or second positioning assistance information includes an indication of which of the plurality of positioning techniques should be used by the terminal device as the second positioning technique for determining the second location information.

Paragraph 9. The method of any one of paragraphs 1 to 8, wherein the first and/or second positioning technique includes at least one positioning techniques selected from the group comprising: a global navigation satellite system positioning technique; a wireless local area network positioning technique; a radio network access node identifier positioning technique; a radio network access node ranging technique; a radio beacon positioning technique; a gyroscopic positioning technique; and a barometric pressure measurement positioning technique.

Paragraph 10. The method of any one of paragraphs 1 to 9, wherein the first and second positioning techniques rely on the same form of positioning measurements made by the terminal device, but wherein the positioning measurements are made more frequently by the terminal device in accordance with the second positioning technique than in accordance with the first positioning technique.

Paragraph 11. The method of any one of paragraphs 1 to 10, wherein first trigger condition is associated with a threshold distance from the target location and the first trigger condition is deemed to be satisfied when the first location information for the terminal device indicates the terminal device is within the threshold distance from the target location.

Paragraph 12. The method of any one of paragraphs 1 to 11, wherein first trigger condition is associated with an identifier for a radio network access node in the wireless telecommunications system in the vicinity of the target location, and wherein the first trigger condition is deemed to be satisfied when the terminal device determines from radio signalling received from the radio network access node associated with the identifier that the terminal device is within a radio coverage area served by the radio network access node.

Paragraph 13. The method of any one of paragraphs 1 to 12, further comprising establishing a second trigger condition for using a third positioning technique, wherein the second trigger condition is dependent on the target location; and, in response to determining the second trigger condition is satisfied, determining third location information for the terminal device from measurements made by the terminal device in accordance with the third positioning technique and third positioning assistance information received from the location server for the third positioning technique.

Paragraph 14. The method of any one of paragraphs 1 to 13, further comprising, in response to determining the first trigger condition is satisfied, launching an application on the terminal device for a location based service.

Paragraph 15. The method of paragraph 14, wherein the first and/or second positioning assistance information includes information to support the application launched on the terminal device for a location based service.

Paragraph 16. The method of any one of paragraphs 1 to 15, wherein the second location information comprises an indication of an identifier or display location for an object at the target location.

Paragraph 17. A terminal device for providing a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the terminal device comprises controller circuitry and transceiver circuitry configured to operate together such that the terminal device is operable to: establish a target location; select a first positioning technique to use for navigating towards the target location; receive first positioning assistance information from the location server for the first positioning technique; determine first location information for the terminal device from positioning measurements made by the terminal device in accordance with the first positioning technique and the first positioning assistance information; establish a first trigger condition for using a second positioning technique, wherein the first trigger condition is dependent on the target location; and, to determine the first trigger condition is satisfied, and in response thereto, to determine second location information for the terminal device from measurements made by the terminal device in accordance with the second positioning technique and second positioning assistance information received from the location server for the second positioning technique.

Paragraph 18. Circuitry for a terminal device for providing a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the circuitry comprises controller circuitry and transceiver circuitry configured to operate together such that the circuitry is operable to: establish a target location; select a first positioning technique to use for navigating towards the target location; receive first positioning assistance information from the location server for the first positioning technique; determine first location information for the terminal device from positioning measurements made by the terminal device in accordance with the first positioning technique and the first positioning assistance information; establish a first trigger condition for using a second positioning technique, wherein the first trigger condition is dependent on the target location; and, to determine the first trigger condition is satisfied, and in response thereto, to determine second location information for the terminal device from measurements made by the terminal device in accordance with the second positioning technique and second positioning assistance information received from the location server for the second positioning technique.

Paragraph 19. A method of operating a location server to support a navigation function for a terminal device in a wireless telecommunications system, wherein the location server is operable to provide the terminal device with positioning assistance information for the terminal device to use with positioning measurements made by the terminal device to determine location information for the terminal device in accordance with a plurality of positioning techniques, wherein the method comprises: receiving from the terminal device an indication of a target location; establishing a first positioning technique for the terminal device to use for navigating towards the target location; establishing first positioning assistance information for the first positioning technique for the terminal device; establishing a first trigger condition for the terminal device to use a second positioning technique, wherein the first trigger condition depends on the target location; and transmitting an indication of the first positioning assistance information and an indication of the first trigger condition to the terminal device.

Paragraph 20. The method of paragraph 19, further comprising transmitting an indication of which of the plurality of positioning techniques is the second positioning technique to the terminal device.

Paragraph 21. The method of paragraph 19, further comprising establishing second positioning assistance information for the second positioning technique and transmitting an indication of the second positioning assistance information to the terminal device.

Paragraph 22. The method of paragraph 21, wherein the transmitting the indication of the second positioning assistance information to the terminal device is performed in response to receiving from the terminal device an indication the first trigger condition has been satisfied.

Paragraph 23. The method of paragraph 19, further comprising determining a location for the terminal device, and wherein the first positioning assistance information is established in dependence on the determined location for the terminal device.

Paragraph 24. A location server for supporting a navigation function for a terminal device in a wireless telecommunications system, wherein the location server is operable to provide the terminal device with positioning assistance information for the terminal device to use with positioning measurements made by the terminal device to determine location information for the terminal device in accordance with a plurality of positioning techniques, wherein the location server comprises controller circuitry and transceiver circuitry configured to operate together such that the location server is operable to: receive from the terminal device an indication of a target location; establish a first positioning technique for the terminal device to use for navigating towards the target location; establish first positioning assistance information for the first positioning technique for the terminal device; establish a first trigger condition for the terminal device to use a second positioning technique, wherein the first trigger condition depends on the target location; and transmit an indication of the first positioning assistance information and an indication of the first trigger condition to the terminal device.

Paragraph 25. Circuitry for a location server for supporting a navigation function for a terminal device in a wireless telecommunications system, wherein the location server is operable to provide the terminal device with positioning assistance information for the terminal device to use with positioning measurements made by the terminal device to determine location information for the terminal device in accordance with a plurality of positioning techniques, wherein the circuitry comprises controller circuitry and transceiver circuitry configured to operate together such that the circuitry is operable to: receive from the terminal device an indication of a target location; establish a first positioning technique for the terminal device to use for navigating towards the target location; establish first positioning assistance information for the first positioning technique for the terminal device; establish a first trigger condition for the terminal device to use a second positioning technique, and wherein the first trigger condition depends on the target location; and transmit an indication of the first positioning assistance information and an indication of the first trigger condition to the terminal device.

REFERENCES

[1] http://www.3gpp.org/DynaReport/36-series.htm
[2] http://www.3gpp.org/DynaReport/38-series.htm
[3] WO2016/130353
[4] LTE Location Based Services—Technology Introduction", Thorpe, Kottkamp, Rossler, Rohde and Schwarz, April 2013
[5] 3GPP TS 36.305 V14.2.0 (2017-06)
[6] 3GPP TS 36.331 V14.2.2 (2017-05)
[7] 3GPP TS 36.401 V14.0.0 (2017-03)
[8] 3GPP TS 36.355 V14.3.0 (2017-09)

The invention claimed is:

1. A method of operating a terminal device to provide a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the method comprises:

establishing a target location;
selecting a first positioning technique to use for navigating towards the target location;
receiving first positioning assistance information from the location server for the first positioning technique;
determining first location information for the terminal device from positioning measurements made by the terminal device in accordance with the first positioning technique and the first positioning assistance information,
establishing a first trigger condition for using a second positioning technique with a higher positioning accuracy than the first positioning technique, wherein the first trigger condition is dependent on the target location and is associated with an identifier for a radio network access node in the wireless telecommunications system in the vicinity of the target location, and the first trigger condition is deemed to be satisfied when the terminal device determines from radio signalling received from the radio network access node associated with the identifier that the terminal device is within a radio coverage area served by the radio network access node; and,
in response to determining the first trigger condition is satisfied, determining second location information for the terminal device from measurements made by the terminal device in accordance with the second positioning technique and second positioning assistance information received from the location server for the second positioning technique.

2. The method of claim 1, wherein the first trigger condition is established by the terminal device from an indication of the first trigger condition received from the location server.

3. The method of claim 2, wherein the indication of the first trigger condition is received from the location server in association with the first positioning assistance information.

4. The method of claim 1, wherein the terminal device receives at least one of the first and second positioning assistance information from the location server in response to transmitting a request for the at least one of the first and second positioning assistance information to the location server.

5. The method of claim 1, wherein the terminal device receives at least one of the first and second positioning assistance information from the location server without transmitting a request for the at least one of the first and second positioning assistance information to the location server.

6. The method of claim 1, wherein the terminal device receives at least one of the first and second positioning assistance information in system information transmitted by a radio network access node in the wireless telecommunications system.

7. The method of claim 1, wherein the second positioning assistance information is obtained from the location server before determining the first trigger condition is satisfied.

8. The method of claim 1, wherein the first and/or second positioning assistance information includes an indication of which of the plurality of positioning techniques should be used by the terminal device as the second positioning technique for determining the second location information.

9. The method of claim 1, wherein the first and/or second positioning technique includes at least one positioning techniques selected from the group comprising: a global navigation satellite system positioning technique; a wireless local area network positioning technique; a radio network access node identifier positioning technique; a radio network access node ranging technique; a radio beacon positioning technique; a gyroscopic positioning technique; and a barometric pressure measurement positioning technique.

10. The method of claim 1, wherein the first and second positioning techniques rely on the same form of positioning measurements made by the terminal device, but wherein the positioning measurements are made more frequently by the terminal device in accordance with the second positioning technique than in accordance with the first positioning technique.

11. The method of claim 1, further comprising establishing a second trigger condition for using a third positioning technique, wherein the second trigger condition is dependent on the target location; and, in response to determining the second trigger condition is satisfied, determining third location information for the terminal device from measurements made by the terminal device in accordance with the third positioning technique and third positioning assistance information received from the location server for the third positioning technique.

12. The method of claim 11, wherein the second trigger condition is associated with a threshold distance from the target location and the second trigger condition is deemed to be satisfied when the first location information for the terminal device indicates the terminal device is within the threshold distance from the target location.

13. The method of claim 1, further comprising, in response to determining the first trigger condition is satisfied, launching an application on the terminal device for a location based service.

14. The method of claim 13, wherein the first and/or second positioning assistance information includes information to support the application launched on the terminal device for a location based service.

15. The method of claim 1, wherein the second location information comprises an indication of an identifier or display location for an object at the target location.

16. A terminal device for providing a navigation function in a wireless telecommunications system comprising the terminal device and a location server, wherein the terminal device supports a plurality of positioning techniques which use positioning measurements made by the terminal device and positioning assistance information received from the location server to determine location information for the terminal device, wherein the terminal device comprises controller circuitry and transceiver circuitry configured to operate together such that the terminal device is operable to:
 establish a target location;
 select a first positioning technique to use for navigating towards the target location;
 receive first positioning assistance information from the location server for the first positioning technique;
 determine first location information for the terminal device from positioning measurements made by the terminal device in accordance with the first positioning technique and the first positioning assistance information;
 establish a first trigger condition for using a second positioning technique with a higher positioning accuracy than the first positioning technique, wherein the first trigger condition is dependent on the target location, wherein the first trigger condition is dependent on the target location and is associated with an identifier for a radio network access node in the wireless telecommunications system in the vicinity of the target location, and the first trigger condition is deemed to be satisfied when the terminal device determines from radio signalling received from the radio network access node associated with the identifier that the terminal device is within a radio coverage area served by the radio network access node; and,
 to determine the first trigger condition is satisfied, and in response thereto, to determine second location information for the terminal device from measurements made by the terminal device in accordance with the second positioning technique and second positioning assistance information received from the location server for the second positioning technique.

17. A location server for supporting a navigation function for a terminal device in a wireless telecommunications system, wherein the location server is operable to provide the terminal device with positioning assistance information for the terminal device to use with positioning measurements made by the terminal device to determine location information for the terminal device in accordance with a plurality of positioning techniques, wherein the location server comprises controller circuitry and transceiver circuitry configured to operate together such that the location server is operable to:
 receive from the terminal device an indication of a target location;
 establish a first positioning technique for the terminal device to use for navigating towards the target location;

establish first positioning assistance information for the first positioning technique for the terminal device;

establish a first trigger condition for the terminal device to use a second positioning technique with a higher positioning accuracy than the first positioning technique, wherein the first trigger condition depends on the target location, wherein the first trigger condition is dependent on the target location and is associated with an identifier for a radio network access node in the wireless telecommunications system in the vicinity of the target location, and the first trigger condition is deemed to be satisfied when the terminal device determines from radio signalling received from the radio network access node associated with the identifier that the terminal device is within a radio coverage area served by the radio network access node; and transmit an indication of the first positioning assistance information and an indication of the first trigger condition to the terminal device.

* * * * *